United States Patent [19]

Latimer et al.

[11] Patent Number: 5,086,879
[45] Date of Patent: Feb. 11, 1992

[54] SCALE CALIBRATION/ZEROING IN DATA GATHERING SYSTEM

[75] Inventors: David L. Latimer; Howard H. Nojiri, both of Eugene, Oreg.; James F. Million, Powell; Steven R. Grimm, Dublin; David S. Platt, Worthington, all of Ohio

[73] Assignees: Spectra-Physics, Inc., San Jose, Calif.; Toledo Scale Corporation, Worthington, Ohio

[21] Appl. No.: 579,243

[22] Filed: Sep. 4, 1990

Related U.S. Application Data

[63] Continuation of Ser. No. 328,188, Mar. 24, 1989, abandoned.

[51] Int. Cl.⁵ .................... A47F 9/02; G06K 7/10
[52] U.S. Cl. ........................ 186/61; 177/50; 235/383; 235/462
[58] Field of Search ............... 186/61; 235/383, 462; 364/405, 567; 177/1, 50, 245

[56] References Cited

U.S. PATENT DOCUMENTS

| | | | |
|---|---|---|---|
| 4,425,975 | 1/1984 | Luchinger | 177/50 |
| 4,656,344 | 4/1987 | Mergenthaler et al. | 235/462 |
| 4,660,663 | 4/1981 | Amacher et al. | 177/50 |
| 4,716,281 | 12/1987 | Amacher et al. | 235/383 |
| 4,751,661 | 6/1988 | Amacher et al. | 364/567 |
| 4,760,539 | 7/1988 | Amacher et al. | 364/571 |
| 4815,547 | 3/1989 | Dillon et al. | 177/255 X |

Primary Examiner—F. J. Bartuska
Attorney, Agent, or Firm—Killworth, Gottman, Hagan & Schaeff

[57] ABSTRACT

A data gathering system adapted to be installed within a checkout counter for determining information about products presented for purchase at the counter including the weight of such products comprises two support flanges within the checkout counter. The support flanges define a portion of an upper surface of the data gathering system and a scale supported by the flanges defines the remaining upper surface which comprises a weighing platter for the scale. A scale calibrating and zeroing system is incorporated into the support flanges to be accessible through the upper surface of the data gathering system such that the scale can be periodically zeroed and calibrated as necessary to maintain the accuracy of the scale without removal of the data gathering system from the counter.

19 Claims, 5 Drawing Sheets

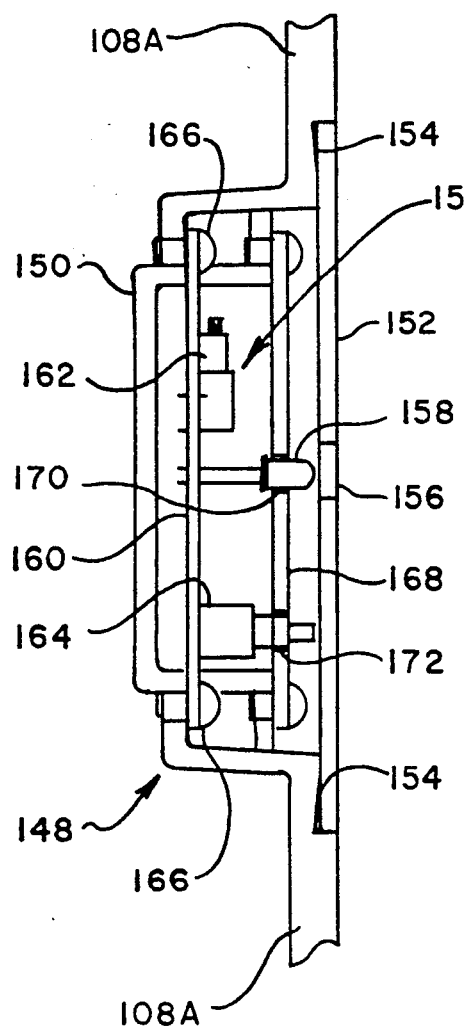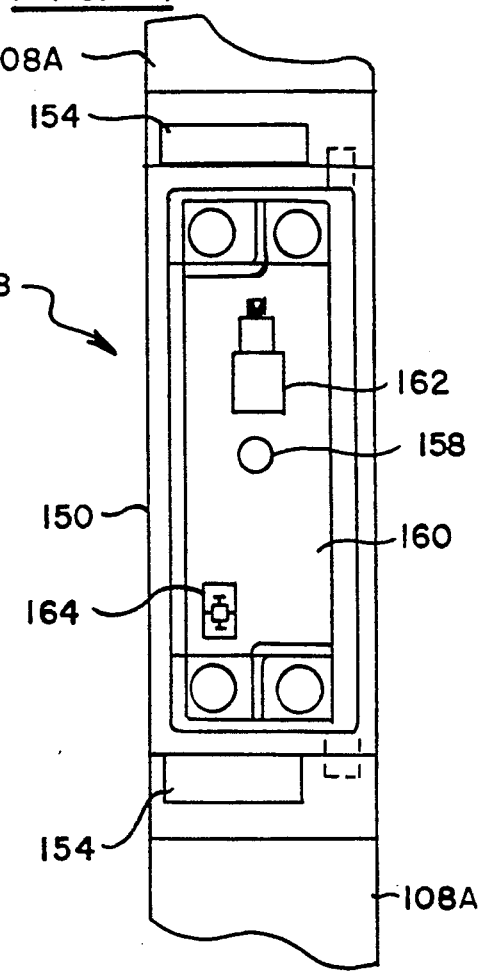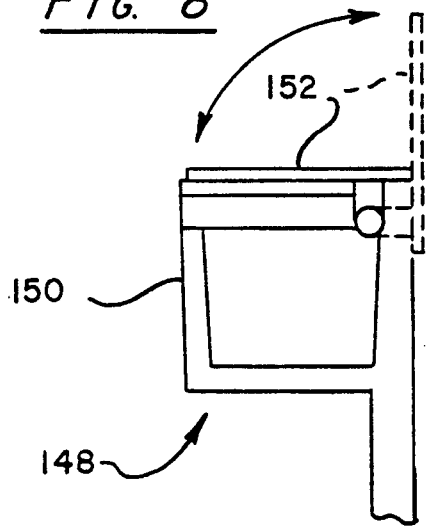

SCALE CALIBRATION/ZEROING IN DATA GATHERING SYSTEM

This is a continuation of application Ser. No. 328,188, filed Mar. 24, 1989, now abondoned.

CROSS REFERENCE TO RELATED APPLICATIONS

The present application is related to the following U.S. Patent Applications which were filed on even date herewith: Data Gathering System Including Cradle Support, Ser. No. 328,178: Method and Apparatus for Mounting Data Gathering System, Ser. No. 328,229: Spill Control Mounting for Data Gathering System, Ser. No. 328,230: Data Gathering System Housing/Mounting, Ser. No. 328,461: and, Point-of-Sale Data Gathering System, Ser. No. 328,272.

BACKGROUND OF THE INVENTION

The present invention relates generally to scales and data gathering systems including scales which are installed in point of sale checkout counters for determining product information including the weights of products presented for purchase at the counters and, more particularly, to a scale calibrating/zeroing system which is incorporated into a scale or data gathering system for access through the upper surface thereof such that a scale can be periodically calibrated and zeroed as necessary to maintain its accuracy without removal of the scale or data gathering system from the checkout counter.

Supermarket checkout counters commonly include optical scanners mounted therein for optically scanning bar code lables on products to be purchased as the products are moved over scanning windows in the top surfaces of the scanners. The scanners read and convert the bar code lables into product identification and pricing information which is used for the sale and other merchandising purposes, such as inventory control. Since many products sold in supermarkets, for example produce, are sold by weight, oftentimes weighing scales are also positioned adjacent the checkout counters. The weighing scales can be manually operable such that sales clerks weigh products and then enter the resulting prices on associated registers. Alternately, the weighing scales can be partially or fully automated such that the weights and corresponding price information are directly passed to the registers.

One example of an automated data gathering system is disclosed in U.S. Pat. No. 4,656,344, wherein a scale and an optical scanner are not only directly interconnected to an associated register but also are integrated into a single unit which fits within the checkout counter. While this integrated scale/scanner system offers advantages over the prior separated component systems in terms of convenience and space savings, still there are disadvantages and inconveniences associated with the integrated system.

For example, by making the scale and scanner a single integrated unit, the system is heavy and difficult to install and/or remove from a receiving checkout counter. While access panels can be provided in the checkout counter, if they are not, the problem is aggravated since the system otherwise must be removed from the checkout counter each time the scale is to be repaired or calibrated and then the system must be reinstalled. Further, the top surface of the system is slotted making it difficult to slide packages thereover and resulting in the collection of debris. Such debris can interfere with the passage of scanning light and also change the scale zero. If rezeroing is required, the top plate of the system must be removed or the power recycled, both operations being time consuming and a nuisance to the operator.

Of course, scales alone which may be installed into a checkout counter and other improved data gathering systems, such as the data gathering system disclosed herein which is the subject of U.S. Pat. Application entitled Point-of-Sale Data Gathering System Ser. No. 328,272, may be sufficiently light in weight or structured such that they can be more easily handled to overcome the installation and removal problem. However, movement of a scale or data gathering system may affect calibration, increases the possibility of damage due to handling and, in any event, requires additional service time and therefore expense such that even for these scales and improved systems, repeated movement for routine maintenance is undesirable and to be avoided.

Accordingly, there is a need for a scale calibration and zeroing arrangement which permits the scale or scale incorporating data gathering system to remain in place within a checkout counter while the scale is calibrated and/or zeroed. Preferably, zeroing of the scale can be quickly performed without interrupting its power supply or partially disassembling the system.

SUMMARY OF THE INVENTION

This need is met by the present invention wherein a scale adjusting system is incorporated into a data gathering system such that the scale adjusting system can be accessed through the upper surface of the data gathering system. In this way, a scale of the data gathering system can be periodically calibrated and zeroed as necessary to maintain its accuracy without removal of the data gathering system from the checkout counter.

In accordance with one aspect of the present invention, a data gathering system adapted to be installed within a checkout counter for determining information about products presented for purchase at the counter including the weight of products placed upon a weighing portion of an upper surface of the system which is substantially aligned with an upper surface of the counter comprises support means for supporting the data gathering system within the checkout counter. The support means defines a portion of the upper surface of the data gathering system and scale means are secured to the support means and coupled to the weighing portion of the upper surface of the system for determining weights of products placed thereon. Finally, scale adjusting means for calibrating and zeroing the scale means are incorporated into the support means to be accessible through the upper surface of the data gathering system such that the scale means can be periodically zeroed and calibrated as necessary to maintain the accuracy of the scale means without removal of the data gathering system from the counter.

The support means may comprise two support flanges which engage the counter to suspend the data gathering system therewithin with the scale adjusting means being incorporated into one of the support flanges. Preferably, a housing is formed into one of the support flanges and the scale adjusting means is enclosed in the housing. The housing may be closed by a hingedly mounted door which is formed of a ferromagnetic material and maintained in a closed position over the housing by magnets embedded within the support flange including the housing. The scale adjusting means may comprise a scale zeroing switch connected to the scale means, supported within the housing and accessible to an operator of the data gathering system by opening the door. Preferably, the scale adjusting means further comprises a scale calibrating switch connected to the scale means, supported within a chamber formed in the housing and accessible to scale service personnel upon opening the door into the housing and opening the chamber within the housing. The chamber may be sealed in accordance with local weights and measures requirements to prevent access to the calibration switch by unauthorized personnel and to maintain the integrity of the scale.

To facilitate operation of the scale adjusting means, it preferably further comprises a light source for signalling persons utilizing the scale adjusting means and the door includes a window through which the light source may be viewed. The light source may be a light emitting diode. The data gathering system may further comprise a circuit board mounted within the chamber with the scale zeroing switch, the scale calibration switch and the light emitting diode being connected to the circuit board. A cover panel is provide to form an upper wall of the chamber with the scale zeroing switch and the light emitting diode extending through the cover panel which serves to cover and preferably seal the scale calibration switch within the chamber in accordance with local weights and measures requirements.

It is an object of the present invention to provide an improved scale adjusting system for a data gathering system adapted to be installed in a checkout counter and including a weighing scale to permit the scale to be calibrated and/or zeroed without removal of the data gathering system from the counter; to provide an improved scale adjusting system for a data gathering system adapted to be installed in a checkout counter and including a weighing scale wherein the scale adjusting system may be accessed through the upper surface of the data gathering system to permit the scale to be calibrated and/or zeroed without removal of the data gathering system from the counter; and, to provide an improved scale adjusting system for a data gathering system adapted to be installed in a checkout counter and including a weighing scale wherein the scale adjusting system is included within a housing formed into one of two support flanges which suspend the data gathering system within the counter.

Other objects and advantages of the invention will be apparent from the following description, the accompanying drawings and the appended claims.

BRIEF DESCRIPTION OF THE DRAWINGS

FIGS. 6-8 illustrate a preferred arrangement for the scale calibration and zeroing system of the present invention.

DETAILED DESCRIPTION OF THE INVENTION

While generally applicable to scales and data gathering systems which include scales, the scale calibration and zeroing system of the present invention has been incorporated into a combined two part data gathering system which comprises a scale mounted within the counter and an optical scanner rested upon a load receiving plate of the scale such that bar coded labels on products can be read by the optical scanner and the weight of such products can also be determined by placement on the optical scanner. Accordingly, the scale calibration and zeroing system will be described with reference to such a combined two part data gathering system.

Reference is now made to the drawings which show a data gathering system 100 in accordance with the present invention which is designed for use in a point of sale checkout counter 102. The data gathering system 100 is designed to be fitted entirely within the counter 102 and is structured as two separate units which can be independently manufactured, tested, packaged and shipped and also individually handled and installed. By structuring the system as two separate units, it initially can be easily installed in the counter 102 and thereafter easily removed and reinstalled for system maintenance and repair. Further, the scanning operation can be more easily and accurately performed since scanning light beams pass directly from the scanner as opposed to passage through secondary windows and/or apertures as in prior art systems wherein a scale platter is required above the top of the scanner. The data gathering system 100 conveniently provides for both reading bar-coded labels secured to products to be purchased and also weighing products which are placed upon the upper surface of the system.

Figure 3:
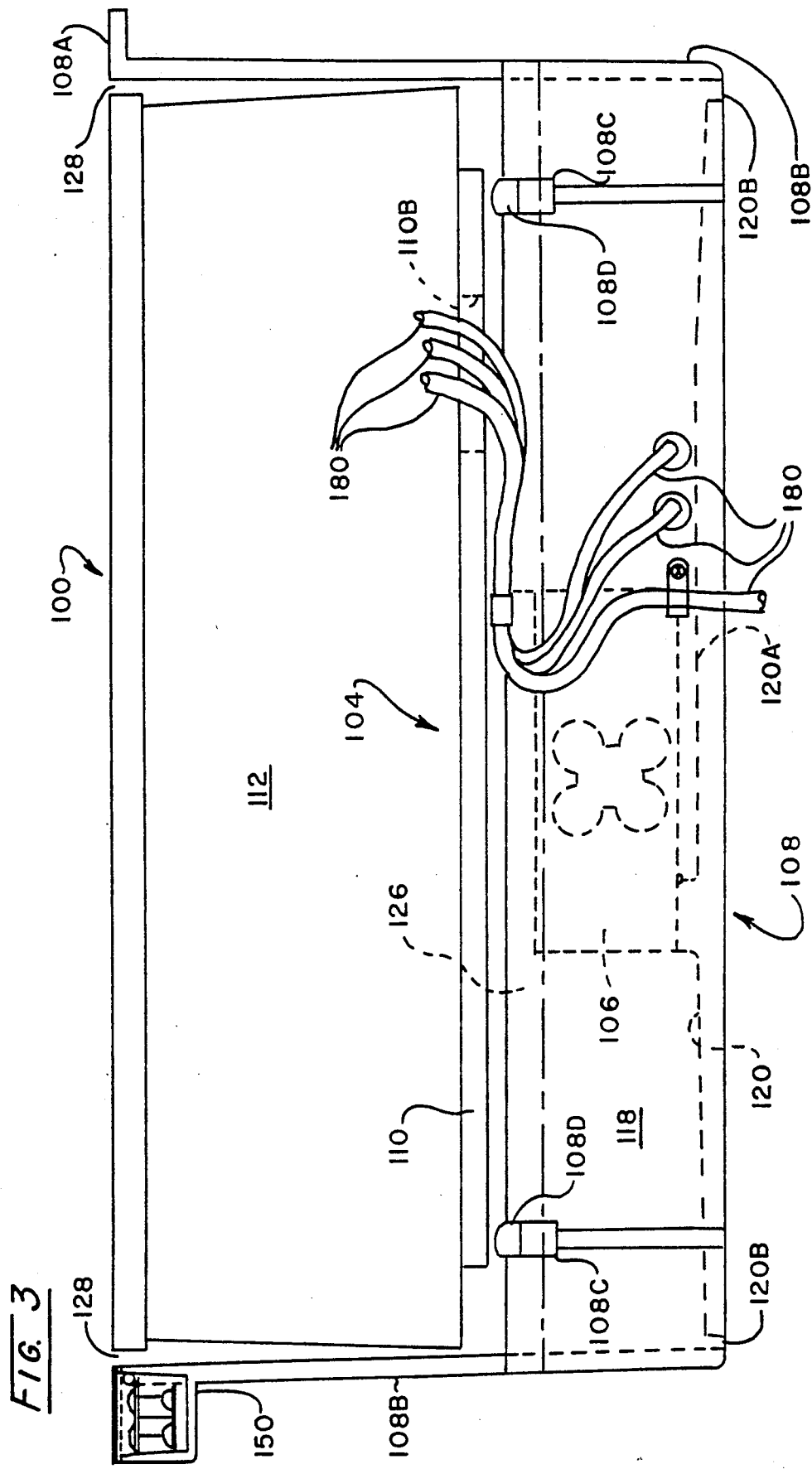
Figure 4:
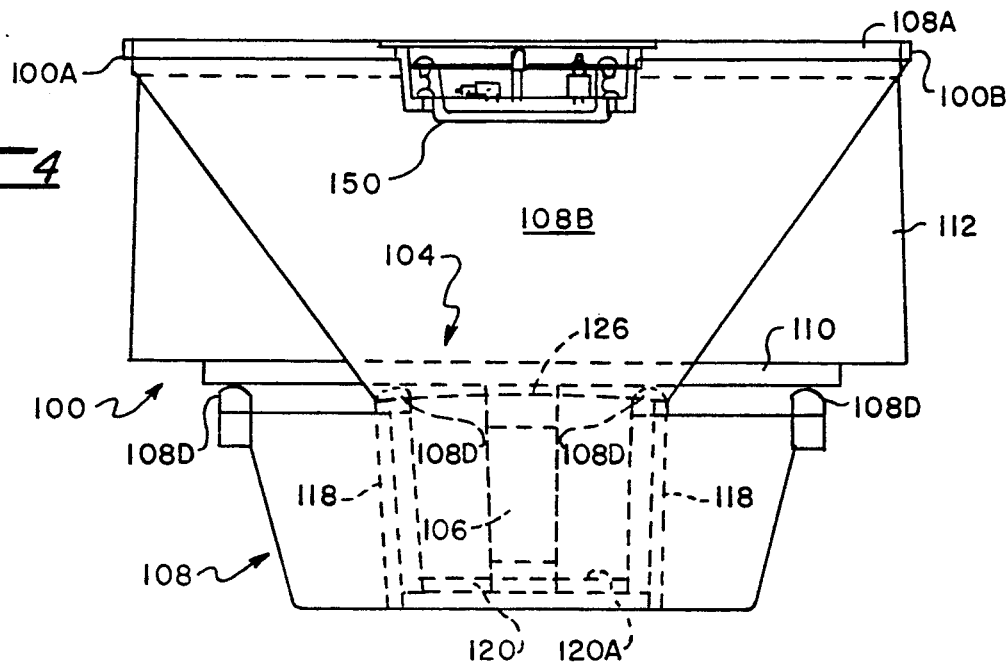

The data gathering system 100 comprises scale means, taking the form of a load cell scale 104 in the illustrated embodiment, which is supported within the checkout counter 102 by support means and provides for determining weights of products presented to the data gathering system 100. The scale 104 comprises a cantilever beam load cell 106 secured at one end 106A to the support means which comprises a support cradle 108 in the illustrated embodiment, and to a scale load receiving plate or subplatter 110 at its opposite end 106B. The subplatter 110 is located below the upper surface 102A of the checkout counter 102 as best shown in FIGS. 3 and 4. The support means may take various forms. For example, the support means may comprise a base casting and associated housing as shown in a data gathering system which is the subject of U.S. Patent Application entitled Data Gathering System Housing/Mounting Ser. No. 328,461 which was filed on even date herewith, is assigned to the same assignee as the present application and is incorporated herein by reference. Those desiring additional information about such alternate support means are referred to this application.

Optical scanning means comprising a self-contained optical scanner 112 is rested upon the scale subplatter 110 for reading coded labels, such as bar-coded labels, on products presented for purchase at the checkout counter 102. The optical scanner 112 has an upper surface 112A including an optical scanning window 112B through which scanning light beams pass. The optical scanning window 112B is flush with the remainder of the upper surface 112A such that the window 112B and upper surface 112A are easy to clean. The remainder of the upper surface 112A defines a weighing area adjacent to the window 112B which receives the majority of items to be weighed such that debris from those items will not fall on the window 112B tending to keep it clean.

The optical scanner 112 is sized and vertically positioned such that its upper surface 112A is substantially aligned with the upper surface 102A of the checkout counter 102 when the optical scanner 112 is rested upon the scale subplatter 110. The weight of the optical scanner 112 and associated cabling is, like that of the subplatter 110, zeroed out in establishing the scale zero reading during calibration or treated as a tare weight for the scale 104. Thus, the upper surface 112A of the optical scanner 112 serves as the scale weighing platter for receiving products to be weighed and only the product weights are included in the weight readings.

The scale subplatter 110 and scanner 112 include scanner locator means comprising two raised circular bosses 110A on the subplatter 110 which are received by corresponding indentations (not shown) formed into the bottom of the optical scanner 112 in the illustrated embodiment. The scanner locator means provide for positioning and horizontally stabilizing the optical scanner 112 on the scale subplatter 110 for assembly and operation of the data gathering system 100. Alternately, bosses or pins could be formed on the scanner 112 with matching identations or holes on the subplatter 110, or combinations of bosses and matching indentations could be formed on both the scanner 112 and the subplatter 110. Of course, differently shaped bosses or different locating means can be provided as will be apparent to those skilled in the art.

Figure 1:
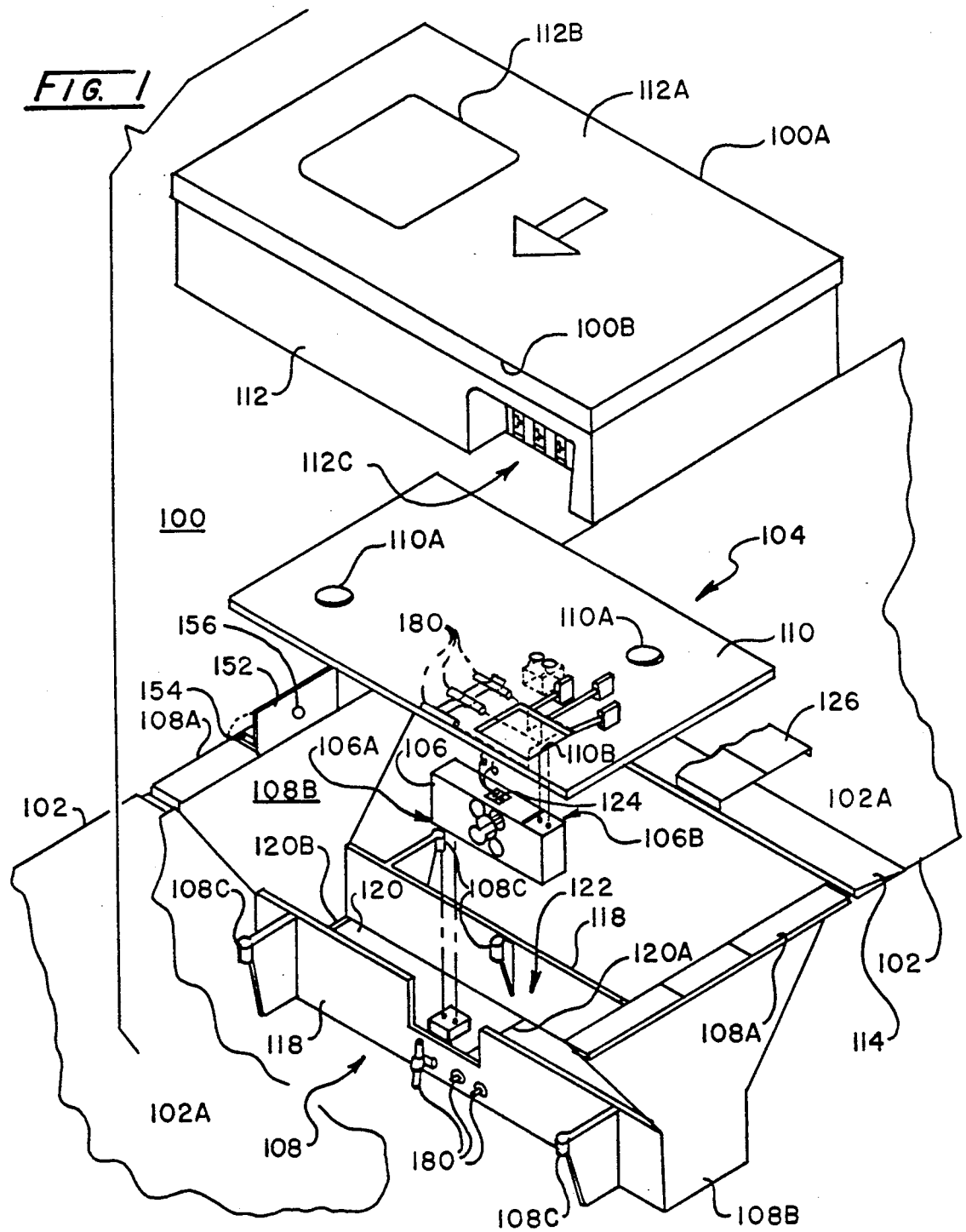
FIG. 1 is an exploded perspective view of a data gathering system for use in a checkout counter including a scale calibration and zeroing system in accordance with the present invention.
Figure 5:
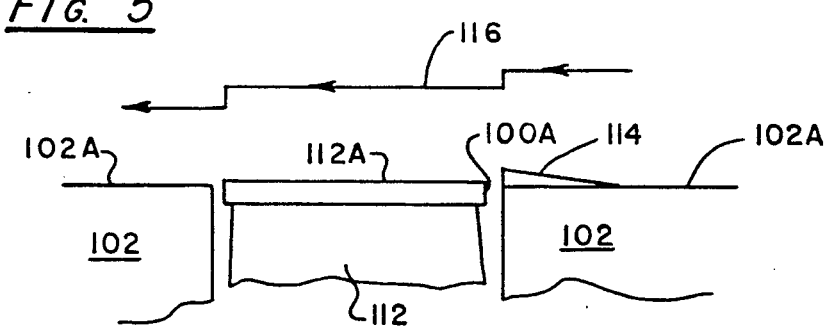
FIG. 5 is a schematic side view of the upper surface of a checkout counter including the data gathering system of FIG. 1 and showing a trim strip for defining a preferred product flow path.

The data gathering system 100 is positioned within the checkout counter 102 such that the upper surface 112A of the optical scanner 112 is slightly above the upper surface 102A of the counter 102 as best shown in FIGS. 1 and 5. This positioning of the data gathering system 100 within the counter 102 combined with a tapered trim strip 114 defines a downwardly stepped path illustrated by the arrow 116 shown in FIG. 5 for products to be processed by the system. The tapered trim strip 114 is secured across the checkout counter 102 adjacent the entry side 100A of the data gathering system 100 to slightly elevate the upper surface 102A of the counter 102 above the upper surface 112A of the system.

The trim strip 114 is shown as having exaggerated thickness in FIG. 5; however, it can be quite thin, as thin as 0.040–0.080 inch depending upon the stiffness of the scale 104, and yet provide smooth passage of products across the data gathering system 100. The downwardly stepped path for products processed by the system is important since the smooth upper surface 112A of the scanner 112 permits products to be slid thereacross by a sales clerk using the data gathering system 100. If a downwardly stepped path is not provided, products may catch at the entry side 100A and potentially at the exit side 100B of the system inconveniencing the sales clerk and substantially reducing this attractive feature of the system.

The support means or support cradle 108 is adapted to be hung from the checkout counter 102 by means of support flanges 108A which extend from end plates 108B of the support cradle 108 to freely suspend the system 100 within the counter 102. The end plates 108B are separated from one another by a distance which is preferably substantially equal to the length of the scanner 112 plus ¼ inch such that with the scanner 112 centered therebetween, a ⅛ inch air gap is maintained at each end of the scanner. Similar sizing/spacing is defined at the entry and exit sides 100A, 100B of the system, see FIGS. 2 and 3.

Such spacing is important since the upper surface of the system defining the scale weighing platter must be free to deflect vertically without contact with the counter to ensure accurate weights. In the prior art, problems have been encountered due to irregularities or insufficient length or width of the counter openings which can result in improper installation and weights. Problems can also be created in the prior art due to lateral movement of the scale caused by placing or sliding products over the scale platter. Such problems are substantially eliminated by the present system. It should be apparent that the counter 102 can be adapted to support the data gathering system 100 from the support flanges 108A such that the system can be precisely located relative to the counter 102 with convenient adjustment, if necessary, being provided by shims or otherwise. The data gathering system 100 may be maintained in position by interengagement of the support flanges 108A with the counter 102 or a variety of fastener devices can be employed if desired as will be apparent to those skilled in the art.

Figure 2:
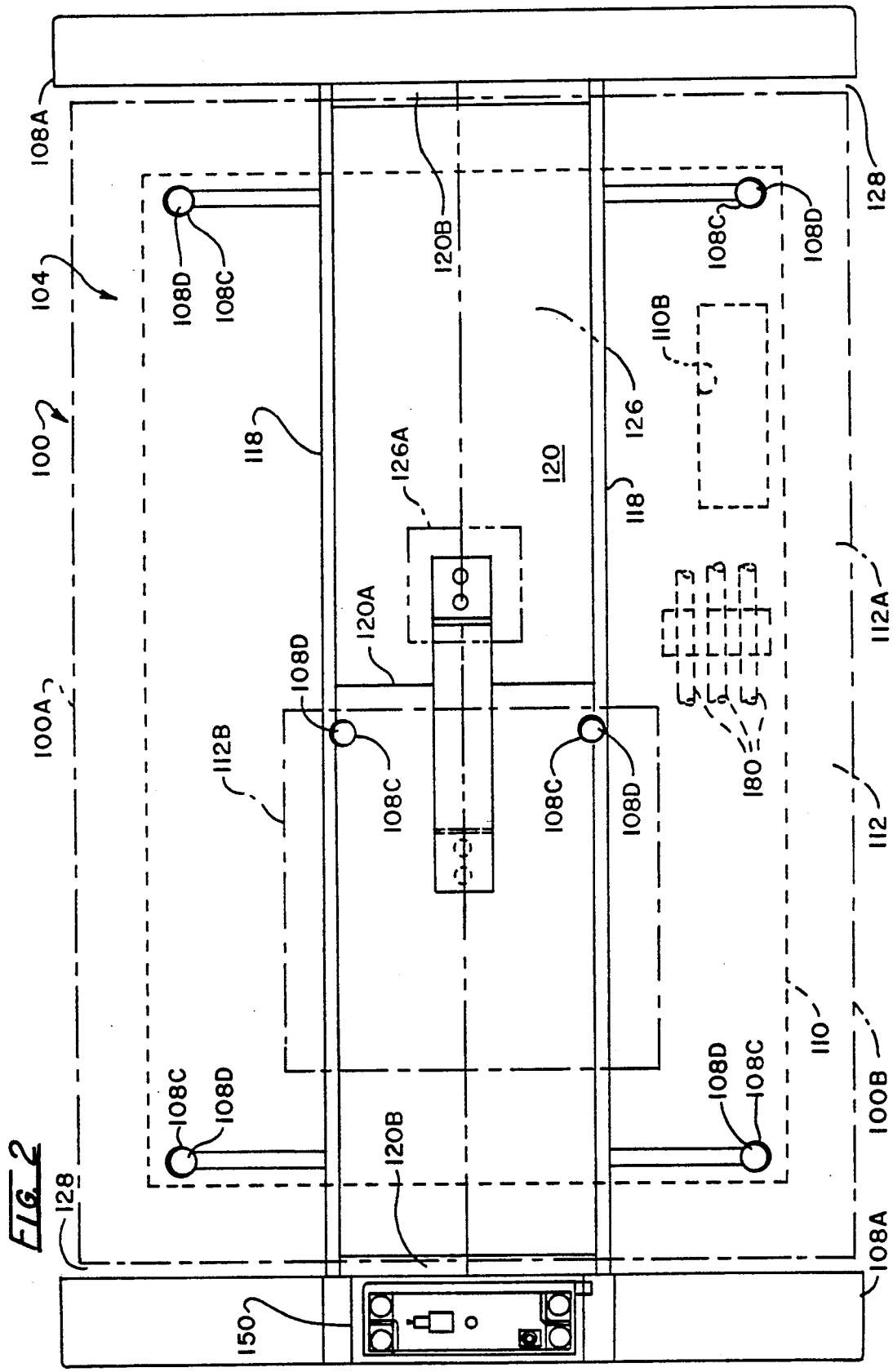
FIGS. 2-4 are top, side and end views, respectively, of the data gathering system of FIG. 1.

The support cradle 108 comprises at least two scale subplatter stop members 108C, six stop members 108C being included in the illustrated embodiment as best shown in FIGS. 1 and 2, positioned to engage the subplatter 110 at the maximum allowable extent of its travel to thereby prevent potentially damaging overloading of the load cell 106. Preferably, stop pads 108D made of hardened tool steel are formed at the upper surfaces of the stop members 108C as shown in FIGS. 2–4.

The support cradle 108 comprises generally vertical side walls 118 and a bottom wall 120 which define a channel 122 extending laterally across the checkout counter 102 for receiving and protecting the load cell 106 and electrical circuitry (not shown) which is connected to and operable with one or more force transducers, such as strain gauges 124, see FIG. 1, of the load cell 106 in accordance with well known weighing scale technology. The bottom wall 120 is peaked near its center 120A such that it gradually tapers downwardly toward the end plates 108B of the support cradle 108 adjacent which the bottom wall 120 terminates in open slots 120B. A crowned channel cover 126, shown in FIGS. 1–4, includes an opening 126A through which the load cell 106 is connected to the scale subplatter 110, see FIG. 2.

This support arrangement or mounting for the data gathering system 100 is preferred since it provides improved spill control over the prior art. In particular, any spilled liquids which flow over the entry side 100A or exit side 100B of the system will flow harmlessly down the sides of the optical scanner 112 to the floor beneath the system where it can be periodically or immediately attended to through access panels (not shown) in the counter 102. Spilled liquids which flow down the ends of the system are limited to some extent by the narrow slots 128 between the optical scanner 112 and the support flanges 108A/end plates 108B of the support cradle 108, see FIGS. 2 and 3. Further, the majority of such liquid will also flow harmlessly to the floor beneath the system due to the narrowness of the width of the channel 122 which is approximately one third of the width of the data gathering system 100. The remaining small portion of spilled liquid which passes through the narrow slots 128 will initially engage the crowned channel cover 126 and be diverted to the sides of the channel 122 and once again to the floor beneath the system.

Any spilled liquid which does manage to seep past the channel cover 126 will flow down the interior surfaces of the end plates 108B and/or be diverted by the tapered bottom wall 120 to pass to the floor beneath the system through the slots 120B. Spilled liquids are thus eliminated from the data gathering system 100 by paths which do not tend to interfere with the movement and hence the operation of the scale 104 of the system. While liquids, particularly thick liquids, may tend to accumulate on the optical scanner walls and change the zero setting of the scale 104, this creates no problem since the scale 104 can be conveniently calibrated and/or automatically or manually zeroed without removal of the system 100 from the counter 102 as will now be described.

The data gathering system 100 includes scale adjusting means comprising a scale calibrating/zeroing system 148 which is integrated into one of the support flanges 108A. The calibrating/zeroing system 148 is enclosed in a housing 150 as generally shown in FIGS. 1-4 and best shown in FIGS. 6-8 wherein various elements of the system are not shown in all the drawing figures for ease of description and illustration. The housing 150 is covered by a hingedly mounted door 152 formed of a ferromagnetic material and maintained in its closed position by magnets 154 embedded within the support flange 108A and includes a window 156 through which a light source such as a light emitting diode (LED) 158 visibly signals a sales clerk using the data gathering system 100 or other personnel servicing the system. Other housing closures such as snap fitting latches and the like will be apparent to those skilled in the art for use in the present invention.

Mounted within a chamber 150A, see FIG. 6, of the housing 150 is a circuit board 160 to which is mounted a scale calibration switch 162, the LED 158 and a scale zeroing switch 164. The circuit board 160 is secured within the chamber 150A of the housing 150 by screws 166 or other appropriate fastening devices. A cover panel 168, see FIG. 6, is secured and preferably sealed in the upper part of the housing 150 to form an upper wall of the chamber 150A. The cover panel 168 includes apertures 170 and 172 through which the LED 158 and the zeroing switch 164 protrude, respectively. A lighted switch could be used, if desired, to replace the LED 158 and the zeroing switch 164 for a potentially simplified user interface. In any event, the panel 168 thus permits access to the zeroing switch 164 if the door 152 is opened by a sales clerk or other authorized person to permit convenient zeroing or rezeroing of the scale 104; however, the panel 168 prevents access to the calibration switch 162 which should only be operated by service personnel on a periodic basis. After calibration, the panel 168 would be sealed in accordance with requirements of local weights and measures.

In accordance with the calibrating/zeroing system 148 of the data gathering system 100, if the scale 104 indicates a weight other than zero when nothing is present on the upper surface 112A of the optical scanner 112, the operator can zero the scale 104 by activating the scale zeroing switch 164 after opening the door 152. Zero drifts may be caused, for example, by the accumulation of debris on the extended optical-scanner/weighing-platter combination. Also, to ensure accurate weighing operations, the scale 104 is periodically calibrated or recalibrated by authorized service personnel. However, in this system, as opposed to the prior art, the service person merely has to open the door 152, remove the weights and measures seal and the cover panel 168, and depress the calibration switch 162 to initiate the calibration operation.

Accordingly, the data gathering system 100 does not have to be removed from the counter 102 for such standard maintenance operations. The LED 158 is used to signal the operator that service is required and to assist in performing the service which is required. For example, the LED 158 may be lighted to advise the operator that the scale 104 is zeroed and extinguished if the scale 104 drifts out of zero. For calibration, the lighting of the LED 158 can be controlled to advise the service person that steps of a calibration operation have been properly performed.

As an example of a calibration routine for a scale having a 30 pound (15 kg) capacity, a precision weight of 20 pounds (10 kg) and zero weight may be used. Initially, the calibration switch 162 is depressed to start the calibration routine. The LED 158 will begin to blink indicating the calibrate mode. A service person ensures that no weight is present on the optical-scanner/weight-platter and then depresses the zeroing switch 164. Once this step is successfully completed, the LED 158 is lighted for aproximately 5 seconds and then begins blinking again to signal the service person to place the 20 pound (10 kg) weight on the center of the optical-scanner/weighing-platter and press the zeroing switch 164. The LED 158 will then extinguish for approximately 5 seconds and then light steadily when calibration is completed. From these two known data points, the scale 104 can generate accurate weight signals for products placed on the upper surface 112A of the optical scanner 112. Of course, alternate calibration and zeroing techniques can be used in the calibrating/zeroing system disclosed.

To prevent interference with operation of the scale 104, cables for conducting electrical signals and power between the optical scanner 112 and the scale 104 of the data gathering system 100 are formed and secured to the scale 104 during its manufacture. More particularly, cables 180 are sized such that they extend between and are secured to the scale subplatter 110 and one of the side walls 118 of the channel 122 such that the cables 180 permit free deflection of the load cell 106 but do not affect such deflection, see FIGS. 1-3. By thus sizing and routing the cables 180 such that they do not affect the deflection of the load cell 106, the weight of the cables 180 can be compensated during calibration of the scale 104. This cabling arrangement is important since cables to the optical scanner 112 must be routed through the scale subplatter 110 via an opening 110B therethrough. The cables 180 include sufficient slack to permit quick and easy installation and removal of the scanner 112. The cables 180 are then routed up to a vestibule 112C on the scanner 112 and connected to the appropriate connectors therein.

Having thus described the data gathering system of the present invention in detail and by reference to preferred embodiments thereof, it will be apparent that modifications and variations are possible without departing from the scope of the invention defined in the appended claims.

What is claimed is:

1. A data gathering system adapted to be installed within a checkout counter for determining information about products presented for purchase at the counter including the weight of products placed upon a weighing portion of an upper surface of the system which is substantially aligned with an upper surface of said counter, said data gathering system comprising:
   support means for supporting said data gathering system within said checkout counter, said support means defining a portion of the upper surface of said data gathering system;
   scale means secured to said support means and coupled to said weighing portion of the upper surface of said system for determining weights of products placed thereon; and
   scale adjusting means for calibrating and zeroing said scale means, said scale adjusting means comprising a scale zeroing switch connected to said scale means and being incorporated into said support means to be accessible to an operator of said data gathering system through the upper surface thereof and a scale calibration switch connected to said scale means and accessible to scale service personnel but inaccessible to an operator of said data gathering system whereby said scale means can be periodically zeroed and calibrated as necessary to maintain the accuracy of said scale means without removal of the data gathering system from said counter.

2. A data gathering system adapted to be installed within a checkout counter as claimed in claim 1 wherein said support means comprises two support flanges which engage said counter to suspend said data gathering system therewithin and said scale adjusting means is incorporated into one of said support flanges.

3. A data gathering system adapted to be installed within a checkout counter as claimed in claim 2 further comprising a housing formed into one of said support flanges wherein said scale adjusting means is enclosed in said housing.

4. A data gathering system adapted to be installed within a checkout counter as claimed in claim 3 wherein said scale zeroing switch is supported within said housing to be accessible to an operator of said data gathering system.

5. A data gathering system adapted to be installed within a checkout counter as claimed in claim 4 wherein said scale calibration switch is supported within a chamber formed in said housing and accessible to scale service personnel upon opening said chamber within said housing.

6. A data gathering system adapted to be installed within a checkout counter as claimed in claim 5 wherein said chamber is sealed to prevent access to said calibration switch by unauthorized personnel.

7. A data gathering system adapted to be installed within a checkout counter as claimed in claim 6 wherein said scale adjusting means further comprises a light source for signalling persons utilizing said scale adjusting means.

8. A data gathering system adapted to be installed within a checkout counter as claimed in claim 7 wherein said light source is a light emitting diode.

9. A data gathering system adapted to be installed within a checkout counter as claimed in claim 8 further comprising a circuit board mounted within said chamber, said scale zeroing switch, said scale calibration switch and said light emitting diode being connected to said circuit board.

10. A data gathering system adapted to be installed within a checkout counter as claimed in claim 9 further comprising a cover panel forming an upper wall of said chamber, said scale zeroing switch and said light emitting diode extending through said cover panel which serves to cover and seal said scale calibration switch within said chamber.

11. A data gathering system adapted to be installed within a checkout counter as claimed in claim 3 wherein said housing is closed by a movable door.

12. A data gathering system adapted to be installed within a checkout counter as claimed in claim 11 wherein said movable door is hingedly mounted, formed of a ferromagnetic material and maintained in a closed position over said housing by magnets embedded within the support flange including said housing.

13. A data gathering system adapted to be installed within a checkout counter as claimed in claim 12 wherein said scale zeroing switch is supported within said housing and accessible to an operator of said data gathering system by opening said door.

14. A data gathering system adapted to be installed within a checkout counter as claimed in claim 13 wherein said scale calibration switch is supported within a chamber formed in said housing and accessible to scale service personnel upon opening said door into said housing and opening said chamber within said housing.

15. A data gathering system adapted to be installed within a checkout counter as claimed in claim 14 wherein said chamber is sealed to prevent access to said calibration switch by unauthorized personnel.

16. A data gathering system adapted to be installed within a checkout counter as claimed in claim 15 wherein said scale adjusting means further comprises a light source for signalling persons utilizing said scale adjusting means and said door includes a window through which said light source may be viewed.

17. A data gathering system adapted to be installed within a checkout counter as claimed in claim 16 wherein said light source is a light emitting diode.

18. A data gathering system adapted to be installed within a checkout counter as claimed in claim 17 further comprising a circuit board mounted within said chamber, said scale zeroing switch, said scale calibration switch and said light emitting diode being connected to said circuit board.

19. A data gathering system adapted to be installed within a checkout counter as claimed in claim 18 further comprising a cover panel forming an upper wall of said chamber, said scale zeroing switch and said light emitting diode extending through said cover panel which serves to cover and seal said scale calibration switch within said chamber.

* * * * *